(No Model.)  
2 Sheets—Sheet 1.

A. R. WOODYATT.
LAWN MOWER.

No. 510,753.  
Patented Dec. 12, 1893.

Witnesses:  
Chas. Raley.  
W. Noffke.

A. R. Woodyatt.  
Inventor  
by A. Harvey  
Attorney (No Model.) 2 Sheets—Sheet 2.
A. R. WOODYATT.
LAWN MOWER.
No. 510,753. Patented Dec. 12, 1893.
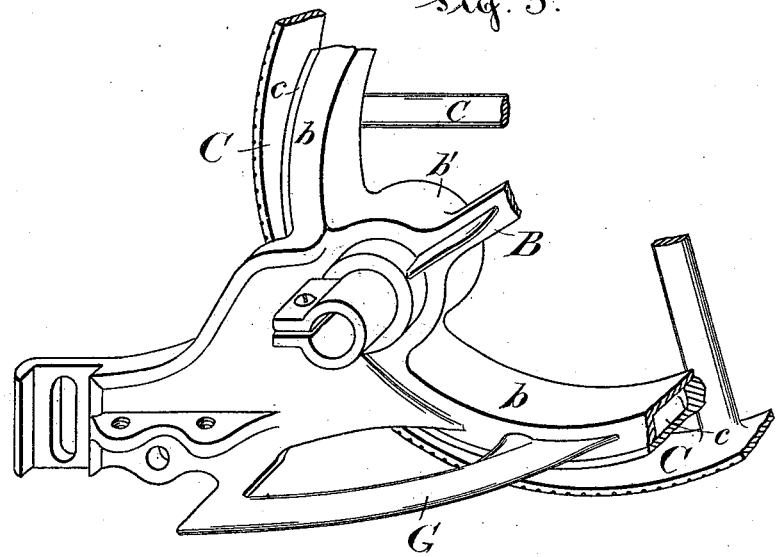
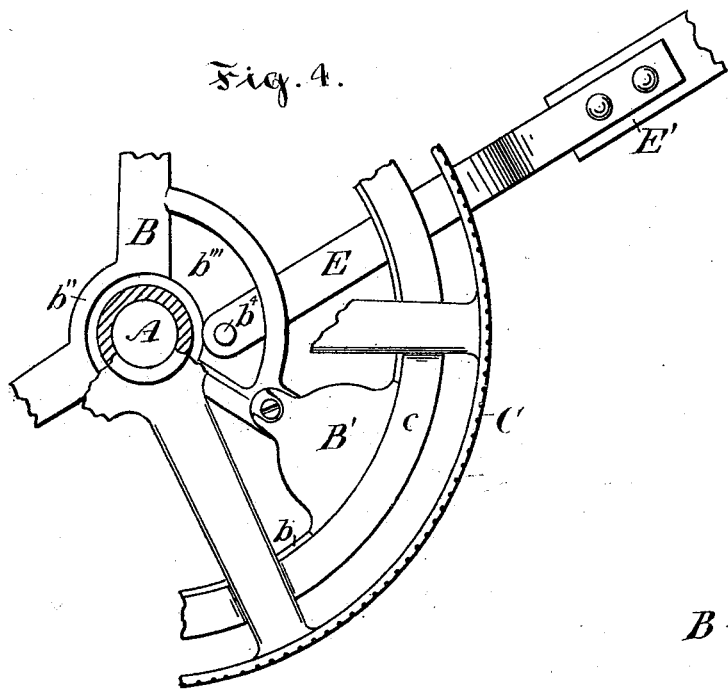
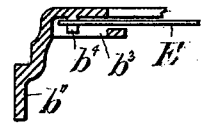
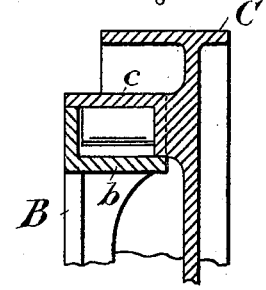
Witnesses:
Chas. Raley.
W. Noffke.
A. R. Woodyatt
Inventor
by A. Harvey
Attorney

UNITED STATES PATENT OFFICE.

AUGUSTUS R. WOODYATT, OF GUELPH, CANADA.

LAWN-MOWER.

SPECIFICATION forming part of Letters Patent No. 510,753, dated December 12, 1893.

Application filed April 26, 1893. Serial No. 471,969. (No model.)

*To all whom it may concern:*

Be it known that I, AUGUSTUS R. WOODYATT, of the city of Guelph, in the county of Wellington and Province of Ontario, Canada, have invented certain new and useful Improvements in Lawn-Mowers; and I do hereby declare that the following is a full, clear, and exact description of the same, reference being had to the accompanying drawings, forming a part hereof.

My invention, which will be hereinafter fully set forth and claimed, relates to lawn mowers.

The object of my invention is a lawn mower having an easy motion together with a larger and even cut and being more durable and kept more easily in order. These objects I attain by using large driving wheels with inside gear projecting clear of the spokes and allowing it to be completely cased in and protected against dirt and by using a separate detachable cover or cap for the pinion. Further, by attaching the arms to which the pole or handle is secured and which forms part of the same to the framing at a point a little below the level of the center of the driving wheels, so that the pressure on the handle will hold the mower down instead of having a tendency of tilting it up, also by constructing a grass guard which draws in the grass sidewise under the ends of the knives and thus effects a wider cut.

Figure 1:
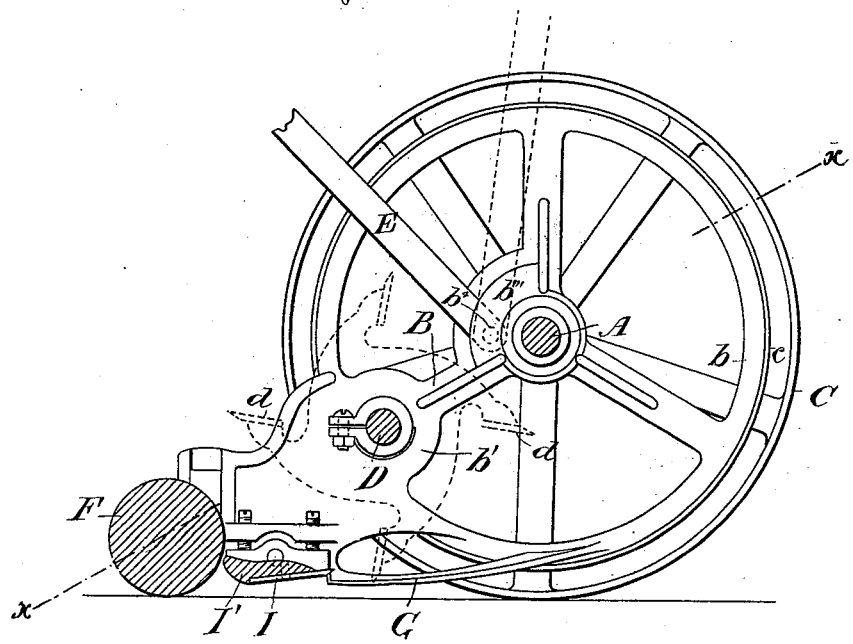
Figure 2:
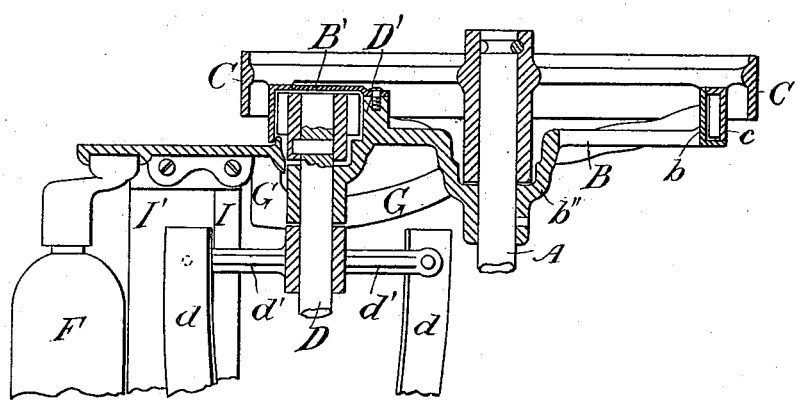

Figure 1 is a transverse section of my improved mower, showing the driving wheel and gear, handle attachment, and grass guard in elevation. Fig. 2 is a section on line $xx$ Fig. 1. Fig. 3 is a perspective view of the driving wheel and gear, showing the grass guard. Fig. 4 is a detail showing the attachment of the handle or pole and the pinion cover. Fig. 5 is a detail showing the attachment of the handle or pole arms, and Fig. 6 is a transverse section of the wheel rim, gearing and gear casing.

A is the axle supporting near each end the framing B with the stationary gear casing $b$ and being supported by the large driving wheels C, mounted rotatively at the ends. An internal spur rim $c$ is formed integrally with the spokes of the drivers, projecting clear therefrom and being of nearly the same diameter and completely covered in by the two sides forming the casing $b$ meeting the edges of the two sides formed at the back and side of the spur rim, $c$, so as to form horizontal joints, as shown in Figs. 2, 3 and 6. The cylinder axle D is journaled in one of the spokes forming part of the frame B, so that the pinion D', connected to said axle in the usual way, so as to gear only in one direction, gears with the internal wheel rim within a suitable casing $b'$ provided on said spoke and closed at the end by a removable cover or cap B'.

The hub $b''$ of the frame B has a slotted extension $b'''$ between the two spokes, of which the lower one carries the pinion casing and journal, provided with a pintle $b^4$ level with or a little below the level of the center of the axle. Said pintle is engaged by an eye in the arm E on which the latter swivels after being inserted through the slot and attached to the handle or pole E', the slot being long enough to allow the handle to be raised and left self-supporting in an upright position, as shown in Fig. 1 in dotted lines and generally in Figs. 1, 4 and 5. The position of the pintle is such that when the machine is in operation and the handle raised, the line of thrust intersects the line connecting the two points of support namely, the axle A and the roller F placed at the rear and supported in the usual manner, at a more or less acute angle and the point of intersection falls below the axle A. In this way the thrust on the handle never tends to lift the back roller off the ground, while the machine is constantly adjusting itself to any inequalities in the surface over which it passes.

The grass guard G is cast integrally with the gear casing $b$ and framing B, Figs. 1, 2 and 3, consisting of a band or strip sloping gradually inward toward the center of the machine and downward and from the casing to the frame extension which carries the knife and back roller.

The knife bar I', having the steel knife I secured to it, is attached in the usual manner to the extension of the frame B which has a bracket provided for the purpose. The cylinder consists of four blades $d$, secured to three spiders $d'$, of the usual construction the central one of which may be loose upon the shaft D serving merely as a mutual support between the blades.

I claim as my invention—

1. In a lawn-mower, the combination with a large driving wheel of an internal spur rim projecting inwardly clear of the spokes and forming two sides of a casing, a casing inclosing the other two sides of the rim and making horizontal joints therewith and forming part of a stationary frame, and an axle upon which said frame is secured, substantially as set forth.

2. In a lawn-mower, the combination with a large driving wheel of an internal spur rim projecting inwardly clear of the spokes and forming two sides of a casing, a frame part of which forms the other two sides of the spur rim casing, and forming horizontal joints therewith and having a recess for the pinion gearing in said spur rim with removable end or cap and a bearing for the shaft carrying said pinion, an axle on which said frame is mounted stationarily, substantially as set forth.

In testimony whereof I have signed this specification in the presence of the undersigned witnesses.

A. R. WOODYATT.

Witnesses:
 JAMES WATT,
 THOMAS C. DAWSON.